US008495868B2

(12) United States Patent
McCoy et al.

(10) Patent No.: US 8,495,868 B2
(45) Date of Patent: Jul. 30, 2013

(54) CONTROL STRATEGY FOR HEATED FLUID LINES

(75) Inventors: Darin McCoy, Dunlap, IL (US); Edward King, Peoria, IL (US); Steve Funke, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 614 days.

(21) Appl. No.: 12/728,990

(22) Filed: Mar. 22, 2010

(65) Prior Publication Data

US 2011/0225950 A1    Sep. 22, 2011

(51) Int. Cl.
   *F01N 3/10*    (2006.01)
(52) U.S. Cl.
   USPC .................................. 60/301; 60/274; 60/286
(58) Field of Classification Search
   USPC ............................................................. 60/301
   See application file for complete search history.

(56) References Cited

U.S. PATENT DOCUMENTS

| 6,063,350 | A | 5/2000 | Tarabulski et al. |
| 6,954,693 | B2 * | 10/2005 | Brackney et al. ............. 701/109 |
| 2007/0251226 | A1 * | 11/2007 | Kaneko ........................... 60/317 |
| 2008/0236153 | A1 * | 10/2008 | St. Aubin et al. ............... 60/327 |
| 2009/0100824 | A1 * | 4/2009 | Starck et al. .................... 60/286 |
| 2009/0183778 | A1 | 7/2009 | Wildegger |
| 2009/0205320 | A1 * | 8/2009 | Mokire et al. .................. 60/286 |
| 2009/0301067 | A1 | 12/2009 | Dingle et al. |

FOREIGN PATENT DOCUMENTS

| DE | 10 2007 055 032 A1 | 5/2009 |
| EP | 1741887 A1 * | 1/2007 |
| WO | 2009/052849 A1 | 4/2009 |
| WO | 2009112516 | 9/2009 |

* cited by examiner

*Primary Examiner* — Thomas Denion
*Assistant Examiner* — Jason Shanske
(74) *Attorney, Agent, or Firm* — Leydig, Voit & Mayer

(57) ABSTRACT

A control strategy selectively controls the heating of fluid lines equipped with line heaters that may be utilized with a selective catalytic reduction system. The control strategy measures a tank temperature representative of reductant agent in a storage tank and a representative ambient temperature representative of an ambient temperature proximate the fluid line. The control strategy determines a lowest possible reductant agent temperature ("LPRAT") based on the measured tank temperature and representative ambient temperature. The LPRAT is compared with a desired reductant agent temperature and, in response to the comparison, the control strategy may activate the line heater.

20 Claims, 4 Drawing Sheets

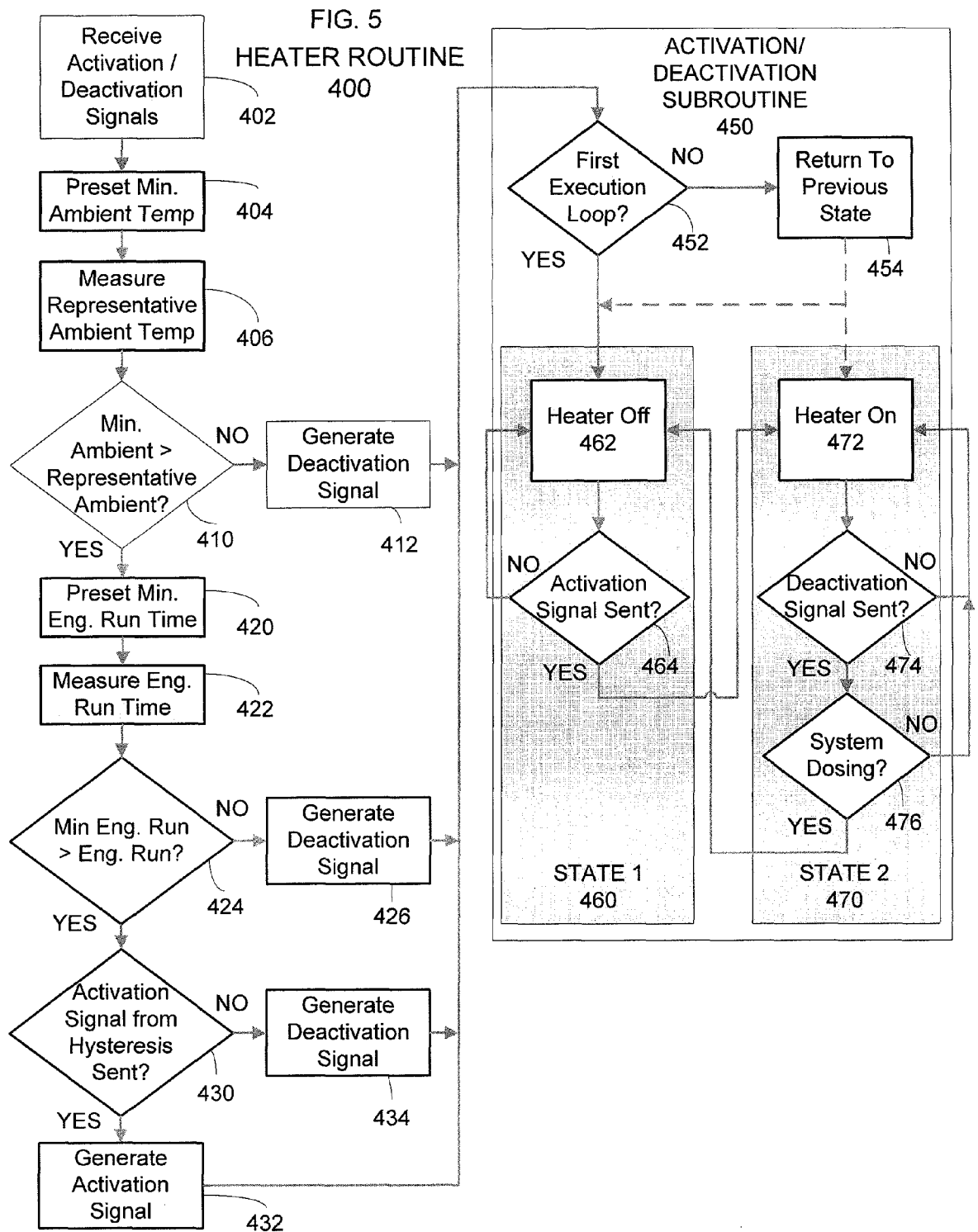

CONTROL STRATEGY FOR HEATED FLUID LINES

TECHNICAL FIELD

This patent disclosure relates generally to an exhaust treatment system for internal combustion engines and, more particularly, to a system and method for thermally handling a fluid reductant agent in such a system.

BACKGROUND

Internal combustion engines, including diesel engines, gasoline engines, and natural gas burning engines, create and emit a variety of different pollutants during operation that may be harmful to the environment and to human and animal health. These air pollutants can include, for example, oxides of nitrogen such as $NO_2$ and $NO_3$, commonly referred to as $NO_x$. Due to increased environmental awareness, including government mandated emissions regulations and control, many manufacturers of internal combustion engines have taken measures to reduce the amount or effect of the pollutants that are created. Some of these measures are incorporated into the exhaust system associated with the internal combustion engine to remove, trap or chemically react with the pollutants being exhausted from the engine.

One type of exhaust treatment measure that reduces NO through a chemical reaction is known as Selective Catalytic Reduction, commonly referred to as SCR. In the SCR process, a gaseous or liquid reductant agent is introduced to the exhaust system where the reductant agent can intermix with the exhaust gasses or it can be absorbed onto a catalyst located in the exhaust system downstream of the internal combustion engine. A common reductant agent is urea, though other suitable substances such as ammonia may be readily used in an SCR process. The NO pollutants can react with the reductant agent and the catalyst such that the NO is converted into environmentally benign nitrogen ($N_2$) and water ($H_2O$).

The reductant agent is often stored in a storage tank that is located proximate to the internal combustion engine. For example, when the internal combustion engine is employed to power a vehicular machine, the storage tank will typically be included as part of the machine. A fluid line may be in fluid communication with the storage tank and the exhaust system to convey the fluid reductant agent to the exhaust system where the reductant agent can be introduced upstream of the catalyst or, in other embodiments, injected onto the catalyst.

Because the internal combustion engine may be used in an extremely cold environment, accommodations must be employed to ensure that the fluid reductant agent does not freeze within the storage tank or the fluid line during operation of the engine. For example, urea typically freezes at 11° C. and if the engine is shut off for prolonged periods in a cold environment, it may be frozen when the engine is next started. An adverse consequence of this scenario is that the SCR system cannot adequately communicate the frozen reductant agent from the storage tank and introduce it into the exhaust system to convert the $NO_x$.

One method of addressing the problems associated with frozen reductant agent in an SCR system is described in U.S. Patent Application Publication No. 2009/0205320 (the '320 application). The '320 publication describes an SCR system having three different heating components placed in three different locations throughout the system. The heating components include an electrical resistance heater disposed in the storage tank for the reductant agent, an engine coolant line passing through the storage tank, and an electric resistance heater proximate to the reductant agent supply line. The '320 application also discloses a control strategy for activating and deactivating the various heating components. However, the control strategy is designed for controlling three distinct heating components and relies on measuring the exact temperature of the reductant agent. Moreover, the disclosed control strategy does not appear to include error-checking strategies to help ensure that the reductant agent is in the appropriate physical state.

The present disclosure is directed at overcoming one or more of the deficiencies set forth above and/or other problems present in the prior art.

SUMMARY

The disclosure describes, in one aspect, a method of controlling a line heater proximate a fluid line for communicating a reductant agent in a selective catalytic reduction system. The method includes the steps of measuring a tank temperature representative of the reductant agent accommodated in a storage tank and measuring a representative ambient temperature representative of an ambient temperature proximate the selective catalytic reduction system. The method then determines a lowest possible reductant agent temperature ("LPRAT") from the tank temperature and the representative ambient temperature. The method compares the LPRAT with a predetermined desired reductant agent temperature and, based in part on that comparison, may activate the line heater to prevent freezing or thaw out reductant agent.

In another aspect, the disclosure describes a selective catalytic reduction ("SCR") system for use with an internal combustion engine. The SCR system includes a storage tank for accommodating a reductant agent and a tank temperature sensor for measuring a tank temperature representative of the reductant agent in the storage tank. The SCR system also includes an ambient temperature sensor for measuring a representative ambient temperature. For communicating reductant agent from the storage tank to an introduction point in an exhaust system, the SCR systems may include a fluid line having a line heater. A controller may communicate with the tank temperature sensor, the ambient temperature sensor, and the line heater, and may include logic for determining an LPRAT based in part on information from the tank temperature sensor and the ambient temperature sensor. The controller activates or deactivates the line heater upon determining the LPRAT.

In another aspect, the disclosure describes a method of reducing nitrous oxides in exhaust from an internal combustion engine. The method provides a catalyst in an exhaust system associated with the internal combustion engine. A reductant agent is accommodated in a storage tank that is in fluid communication with the exhaust system via a fluid line. The method measures a tank temperature representative of the reductant agent in the tank and a representative ambient temperature representative of an ambient temperature proximate the internal combustion engine. The method then determines a LPRAT based in part on the tank temperature and the representative ambient temperature. In response to determining the LPRAT, the method may activate a line heater proximate the fluid line in order to prevent freezing or thaw out the reductant agent.

BRIEF DESCRIPTION OF THE DRAWINGS

FIG. 5 is a schematic flow chart depicting another exemplary routine of the control strategy that controls a line heater in response to various measured, determined and pre-set temperature values.

DETAILED DESCRIPTION

Figure 1:
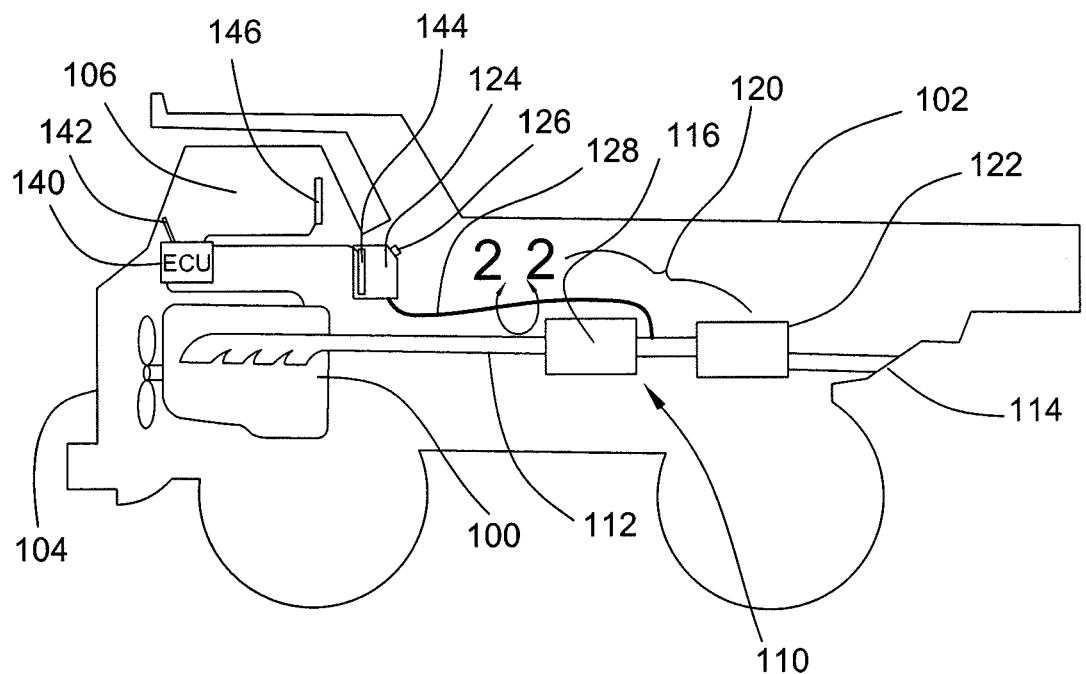
FIG. 1 is a diagrammatical illustration of a machine including a power system in the form of an internal combustion engine and an exhaust treatment system for reducing pollutants from the engine.

Referring to FIG. 1, there is illustrated a power system 100 in the form of an internal combustion engine that is incorporated into a vehicular machine 102 such as a dump truck. Although the illustrated power system 100 is an internal combustion engine and, in particular, a diesel engine, the present disclosure can relate to any suitable type of power system that combusts fossil fuels and similar substances including, for example, gasoline engines, natural gas engines, propane-based engines, and coal-burning power systems. Likewise, although the illustrated machine 102 is a dump truck, it will be appreciated that the power system 100 can be implemented on any type of vehicular machine that utilizes such systems for powering motion or the operation of working implements. The power system 100 can also be utilized in any of various stationary applications such as electric generators and pumps.

The power system 100 is associated with an exhaust system 110 that carries away exhaust products that are produced by the combustion process. The power system 100 and exhaust system 110 are supported by a frame 104 of the machine 102. To accommodate an operator who controls the machine 102, the frame 104 can also support or delineate an operator's cab 106 from where the steering mechanism and various machine controls can be accessed. Of course, in stationary applications, the operator's cab 106 may be unnecessary and therefore not included.

In the illustrated embodiment, the exhaust system 110 includes an exhaust pipe or exhaust channel 112 that is disposed through the machine 102 to convey the exhaust products from the power system 100 to the surrounding environment. While the illustrated exhaust channel 112 is in the form of an elongated conduit extending the length of the machine, it will be appreciated that the exhaust channel can have any suitable shape, size or arrangement depending upon the application in which the power system 100 is used. The exhaust channel 112 terminates at an exhaust orifice 114 where the exhaust products are discharged into the environment.

To reduce the harm or impact that the exhaust products may have on the environment and/or the health of humans and animals, the exhaust system 110 may include one or more after-treatment devices 116 or systems that remove or convert harmful pollutants before they enter the environment. Such devices and systems are often referred to as after-treatment devices because they function or operate after the exhaust products have been created in and discharged from the power system 100 and are thereby distinguished from fuel formulations and similar pre-combustion measures. The after-treatment devices 116 can include mufflers, particulate filters, or catalytic convertors that are disposed into the exhaust channel 112 such that the exhaust gasses are directed through the after-treatment devices causing removal or treatment of the pollutants.

As described above, a particular type of an after-treatment device or system that may be included with the exhaust system 110 is an SCR system 120. SCR systems operate by intermixing a reductant agent with the exhaust gases in the presence of a catalyst 122 to convert harmful $NO_x$ to environmentally more friendly nitrogen ($N_2$) and water ($H_2O$). To store the reductant agent, which typically is a fluid, the SCR system 120 may include a storage vessel or storage tank 124 mounted or supported on the frame 104 of the machine 102. To replenish the supply of reductant agent, the storage tank 124 may include an inlet 126 that is accessible from the exterior of the machine 102. Accordingly, the storage tank 124 itself may be proximate or exposed to the environment surrounding the machine 102 and may be spaced away from the power system 100.

To convey or direct the reductant agent from the storage tank 124 to the exhaust system 110, a fluid line 128 can be arranged in fluid communication with the storage tank and the exhaust channel 112. The fluid line 128 can be any suitable type of line for conveying or directing a fluid such as a flexible hose or a metallic or plastic conduit. In the illustrated embodiment, the fluid line 128 accesses the exhaust channel 112 at a point upstream of the catalyst 122 so that the reductant agent and the exhaust gases can intermix before they enter or come into contact with the catalyst. In other embodiments, the fluid line 128 can access the catalyst 122 itself such that the reductant agent is injected directly therein. The catalyst 122 may be a self-contained unit with an internal structure such as a ceramic honeycomb frame or metal mesh substrate that is coated with a material that initiates or undergoes a chemical reaction to alter the composition of the exhaust gases. The process of introducing reductant agent into the exhaust stream or catalyst is sometimes referred to as "dosing."

Figure 2:
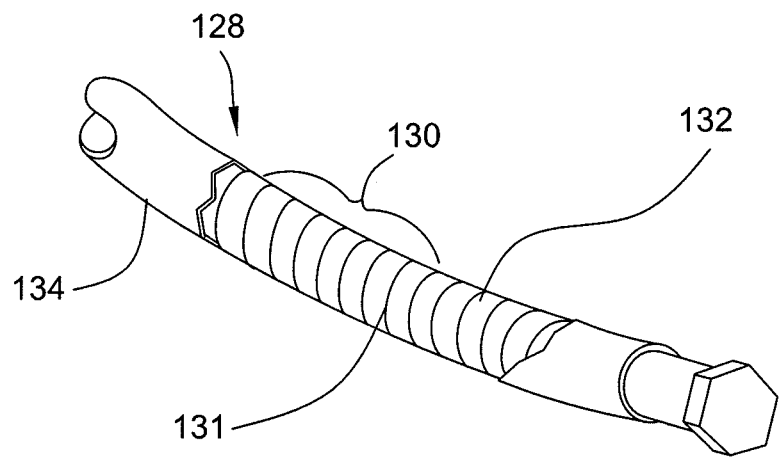
FIG. 2 is a partially cutaway perspective view of an exemplary fluid line for fluid communication of a reductant agent between a storage tank and the exhaust system of the machine.

To prevent the reductant agent from freezing or to melt frozen reductant agent in the fluid line, the fluid line can include or be located proximate to one or more line heaters. Referring to FIG. 2, there is illustrated a suitable version of the fluid line 128 for conveying reductant agent in the form of a heated, multilayered rubber hose. In the illustrated embodiment, the line heater 130 can be in the form of an electrical resistance heater 131 and, more specifically, a continuous metal wire that is spiral wound around the inner core 132 of the fluid line. When an electrical current is applied to the electrical resistance heater, electrical resistance generates thermal heat that heats the fluid line and the reductant agent located therein. To prevent the electrical resistance heater 131 from shorting out or burning other parts of the machine that the fluid line 128 may come into contact with, the electrical resistance heater may be covered by an exterior layer 134 of a suitable insulative material. In other embodiments, including those in which the fluid line has a construction different from a flexible hose, the electrical resistance heater can likewise have a different construction.

Referring back to FIG. 1, to control the dosing of reductant agent into the exhaust stream, the SCR system 120 can include or be associated with an electronic control unit, module or controller 140 located onboard the machine 102. The controller 140 can include a microprocessor or other appropriate circuitry and can have memory or data storage capabilities. Although in FIG. 1 the illustrated controller 140 is represented as a single, discrete unit, in other embodiments the controller and its functions may be distributed among a plurality of distinct and separate units. In addition to controlling the SCR system 120, the controller 140 may be tasked with controlling various other systems and processes associated with the machine. Moreover, the controller 140 can include a user interface 142 accessible from the operator's cab 106 that can communicate information to and receive instructions from an operator.

To receive information regarding the SCR system 120, the controller 140 can be communicately linked with various sensors and instruments disposed about the machine 102. For example, these can include a tank temperature sensor 144 that is disposed inside the storage tank 124 to measure the temperature inside the storage tank. The temperature of the storage tank 124 can provide a suitable approximation of the temperature of the reductant agent stored therein. In fact, if the tank temperature sensor 144 is submerged in the reductant agent, it can provide the exact temperature of the reductant agent.

The controller 140 can also be communicatively linked with an ambient temperature sensor 146 that is disposed at any suitable location on the machine 102 for measuring a temperature representative of the ambient conditions surrounding the SCR system 120. The tank temperature sensor 144 and the ambient temperature sensor 146 can be electronically operated thermometers that provide an electronic or digital output to the controller 140. In other embodiments, the sensors can be virtual sensors that indirectly derive the temperature they are intended to measure by monitoring various other machine parameters and predicting the temperature based on the monitored values. The controller 140 can also be communicatively linked to the power system 100 and other devices and systems on the machine 102 to exchange information regarding the status of and to direct operational control over those devices and systems.

To selectively control the temperature of the fluid line 128 and prevent freezing or melt frozen reductant agent, the controller 140 can include software or logic embodying a control strategy that operates in conjunction with the various temperature sensors to activate the line heater 130. The control strategy can include or be visualized as a series of routines or steps that determine or estimate the lowest temperature possible of the reductant agent, compares that value with predetermined or known information, and activates the line heater in response to that comparison. Also, the control strategy can optionally consider other information such as engine running time and ambient temperature when determining whether the line heater should be activated. A possible advantage of selectively controlling activation of the line heater is that the line heater is only actively heating when necessary to prevent freezing or melt frozen reductant agent. This may result in prolonging the operational life of the line heater.

Figure 3:
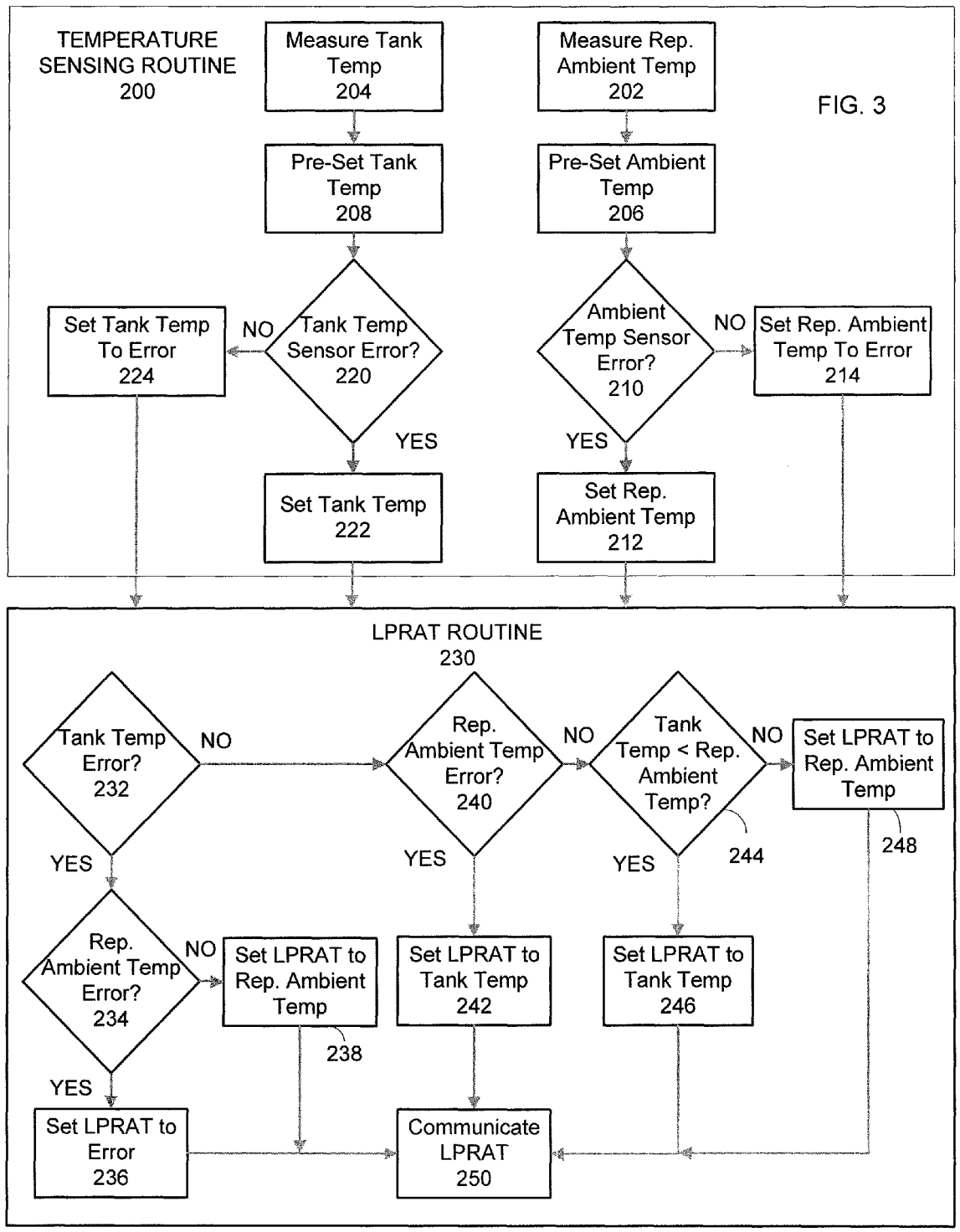
FIG. 3 is a schematic flow chart depicting an exemplary routine that may be part of a control strategy for controlling the temperature of a fluid reductant agent in the exhaust treatment system that may measure various temperatures associated with the exhaust treatment system and may determine a lowest possible reductant agent temperature.

Referring to FIG. 3, there is illustrated a visual representation of an initial or first operation, logic, or routine that can be performed by the control strategy to measure or sense certain temperature parameters associated with the SCR system. The routine, referred to as the temperature sensing routine 200, can in an initial step 202 measure a representative ambient temperature using information from the ambient temperature sensor 146 depicted in FIG. 1. Because the ambient temperature sensor 146 may be a virtual sensor, the measured temperature in step 202 may only be an approximation or estimate representative of the true ambient temperature. In another step 204, which may occur simultaneously with step 202 of measuring the representative ambient temperature, the tank temperature sensor 144 can measure a temperature representative of the temperature inside the storage tank. As mentioned above, the tank temperature may be the same as or a close approximation to the temperature of the reductant agent in the storage tank.

The temperature sensing routine 200 can include logic or software that can check for possible errors or failures of the tank temperature sensor 144 and ambient temperature sensor 146. To accomplish this, in step 206 a predetermined ambient temperature can be set or input into the controller 140 and similarly in step 208 a predetermined tank temperature can be set or input. The predetermined ambient temperature and the predetermined tank temperature may represent a temperature value or a range that the ambient temperature sensor 146 and tank temperature sensor 144 realistically should not measure, such as extremely hot or extremely cold temperatures. If the ambient temperature sensor or tank temperature sensor were to sense such extremely hot or cold temperatures, that would be an indication that the sensors were malfunctioning or damaged. As with all other pre-set or predetermined values discussed herein, predetermined ambient temperature and the predetermined tank temperature may be input to the controller at the time of programming the control strategy or they may be set by an operator of the machine and therefore adjustable.

In a comparison step 210, the representative ambient temperature measured by the ambient temperature sensor 146 is compared with the predetermined ambient temperature to determine if the representative ambient temperature equates with the predetermined ambient temperature. If yes, the temperature sensing routine 200 in step 212 sets or confirms that the measured representative ambient temperature is correct and should be utilized for the remainder of the control strategy. If the comparison step 210 is no, though, in a subsequent step 214 the temperature sensing routine 200 sets or confirms an error with respect to the representative ambient temperature. The measured tank temperature and predetermined tank temperature can likewise be received by and compared in another comparison step 220 to determine if the two values equate. If yes, in step 222 the temperature sensing routine 200 sets or confirms that the measured tank temperature is correct and should be utilized. If the comparison step 220 is no, the temperature sensing routine 200 in a subsequent step 224 sets the tank temperature to error.

The above measured temperatures or determined error values are communicated onto a second phase, logic or routine 230 of the control strategy that calculates or determines the lowest possible temperature of the reductant agent. FIG. 3 depicts an exemplary series of steps that the lowest possible reductant agent temperature ("LPRAT") routine 230 might perform. The LPRAT routine 230 in an initial comparison step 232 determines whether the tank temperature has been set to error by prior step 224. If yes, the LPRAT routine 230 in another comparison step 234 may query whether the representative ambient temperature has set to error by previous step 214. If both the tank temperature and the representative ambient temperature have been set to error, then in a subsequent step 236 the LPRAT routine 230 can set the LPRAT to error. If the comparison step 234 determines that the representative ambient temperature is not in error, and therefore a sufficiently accurate representation of the reductant agent temperature, then in another step 238 the LPRAT routine 230 can set the LPRAT to be equal to the representative ambient temperature.

Referring back to the initial comparison step 234, if the tank temperature is determined to have not been set to error, the LPRAT routine 230 can conduct another comparison step 240 which determines whether the representative ambient temperature has been set to error. If the representative ambient temperature is in error, the comparison step 240 can pass the tank temperature onto step 242 in which the LPRAT is set to equal the tank temperature. If, however, the comparison step 240 determines that the representative ambient temperature is not set to error, both the tank temperature and the representative ambient temperature are passed onto another comparison step 244 which compares the two temperatures to determine which of the two is smaller. If the value of the tank temperature is less than the value of the representative ambient temperature, the LPRAT is set to the tank temperature in step 246. If, however, the value of the representative ambient temperature is less than the value of the tank temperature, the LPRAT is set to the representative ambient temperature in step 248.

Hence, the LPRAT routine 230 will set LPRAT to error if both the ambient temperature sensor and tank temperature sensor are not working properly, or it sets the LPRAT to the lowest value of the representative ambient temperature and the tank temperature if either or both of the ambient temperature sensor and tank temperature sensors are working. After the value of the LPRAT has been set, the LPRAT routine 230 in step 250 can communicate the LPRAT onto the other routines that make up the control strategy.

Figure 4:
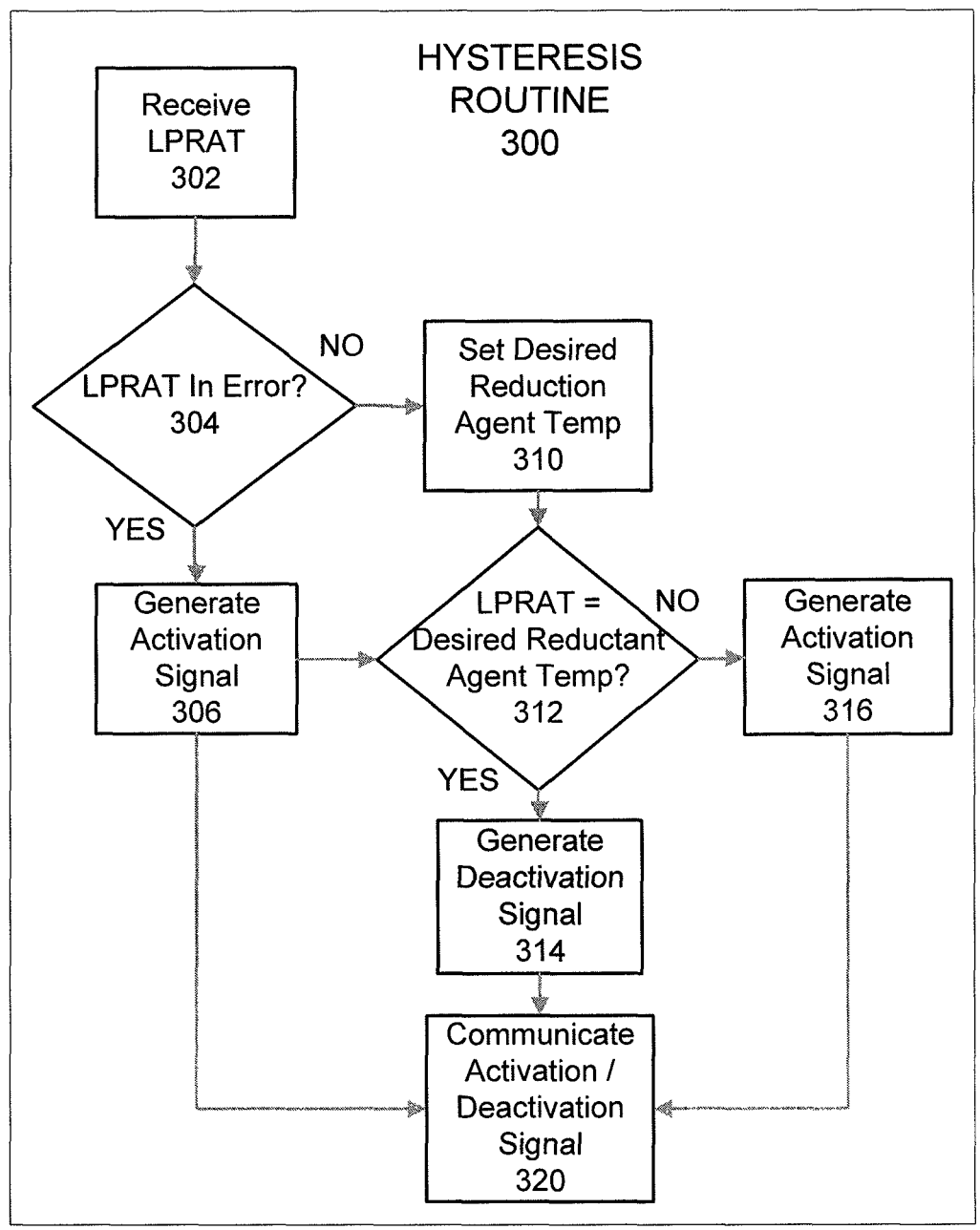
FIG. 4 is a schematic flow chart depicting another exemplary routine of the control strategy that may measure and compare the lowest possible reductant agent temperature with a desired reductant agent temperature.

Referring now to FIG. 4, the control strategy can also include a hysteresis routine 300 that can further process the LPRAT to generate an activation signal or a deactivation signal to activate or deactivate the line heater. As used herein, the activation or deactivation signal can take any suitable form including electrical impulses and/or radio frequency signals. Moreover, in some embodiments, the activation and deactivation signals can be mutually exclusive such that the deactivation signal is represented simply as the absence of an activation signal and vice versa. In an initial step 302, the hysteresis routine 300 can receive the LPRAT that was calculated by the prior LPRAT routine 230. In a comparison step 304, the hysteresis routine 300 can check or determine whether the LPRAT has been set to error. If the LPRAT is in error, meaning that the control strategy cannot determine or approximate the temperature of the reductant agent because of malfunctions with the ambient temperature sensor and tank temperature sensor, the hysteresis routine 300 in step 306 will generate an activation signal for the line heater.

If, however, comparison step 304 determines that the LPRAT is not in error, the hysteresis routine 300 can compare the LPRAT with a predetermined desired reductant agent temperature. The desired reductant agent temperature can be input to the hysteresis routine in step 310. The desired reductant agent temperature can be a precise temperature value or it can be a range of temperature values at which the reductant agent will be in an unfrozen, fluid state and capable of being dosed into the exhaust system. The desired reductant agent temperature is compared with the LPRAT in another comparison step 312 to determine if the two values match. If the LPRAT is equal to or within the desired reductant agent temperature, thereby indicating that the reductant agent is fluid, then the hysteresis routine 300 will generate a deactivation signal in step 314. If, however, the comparison step 312 determines that the LPRAT does not match the desired reductant agent temperature, indicating that the reductant agent may be frozen, then in step 316 the hysteresis routine 300 generates an activation signal to activate the line heater. In the concluding step 320 of the hysteresis routine 300, the activation or deactivation signals are communicated onto the other routines of the control strategy.

Referring to FIG. 5, there is illustrated an example of a heater routine 400 that can activate or deactivate the line heater. In an initial step 402, the heater routine 400 receives the activation or deactivation signals from the hysteresis routine 300 if the hysteresis routine has been performed. The heater routine 400 can perform various initial operations to check the necessity of line heater activation against the ambient temperature and to check whether activation may be premature based on engine running time.

For example, to ensure that the line heaters are not active when the ambient temperature around the SCR system is above the freezing temperature of the reductant agent, the heater routine 400 can check and compare the ambient temperature proximate to the SCR system. In step 404, a pre-set minimum ambient temperature that is at or above the freezing point of the reductant agent can be pre-set or stored as part of the heater routine 400. In step 406, the heater routine 400 can measure the representative ambient temperature for comparison with the pre-set minimum ambient temperature. The representative ambient temperature from step 406 can be measured by the ambient temperature sensor 146 discussed with respect to FIG. 1 and can be an approximation of the true ambient temperature. In a comparison step 410, the representative ambient temperature is compared with the pre-set minimum ambient temperature. If the pre-set ambient temperature is less than the representative ambient temperature, indicating that the temperature about the SCR system is above the freezing point of the reductant agent, the heater routine 400 in step 412 generates a deactivation signal to deactivate the line heater.

If, however, the minimum ambient temperature is greater than the representative ambient temperature, indicating that the temperature about the SCR system is below the freezing point of the reductant agent, the heater routine 400 can conduct further calculations to determine if it may be premature to activate the line heater. For example, while government regulations may require the inclusion of exhaust treatment systems to reduce $NO_x$, they may also provide that such systems need not be effective until or unless the power system has been operating for a specific period of time. This allows the power system to reach normal operating conditions at which point dosing of the reductant agent into the exhaust system may not be necessary. In addition, the delay may allow the power system to heat the area surrounding the SCR system to a temperature above the freezing point of the reductant agent rendering activation of the line heater unnecessary.

To provide for such a delay, a pre-set minimum power system or engine running time can be input into the heater routine 400 in step 420. In step 422, the heater routine 400 can measure the actual running time of the power system from startup. Running time can be measured by any of various types of counters or sensors included on the machine and communicating with the controller. In a comparison step 424, the actual running time of the power system is compared with a pre-set minimum engine running time. If the actual engine running time is less than the pre-set minimum engine running time, indicating that the delay time has not expired and that dosing of the reductant agent would be premature, then in step 426 the heater routine 400 can generate a deactivation signal. If, however, comparison step 424 determines that the actual engine running time is greater than the pre-set minimum engine running time, indicating that the delay time has expired, the heater routine 400 goes on to determine whether it is necessary to activate the line heater.

For example, the heater routine 400 can include a comparison step 430 that queries whether the hysteresis routine 300 generated an activation signal thereby indicating that the reductant agent may be in danger of freezing. If so, in step 432 the heater routine 400 may generate or confirm that the activation signal is set. If, however, the comparison step 430 determines that the hysteresis routine 300 did not generate an activation signal, then in step 434 a deactivation signal is generated or communicated onto the remaining operations of the control strategy.

The heater routine 400 can include an activation/deactivation subroutine 450 that performs a series of steps or operations to cause the actual activation or deactivation of the line heater. For example, the line heater can be in one of two states, with a first state 460 corresponding to the line heater being active and a second state 470 corresponding to the line heater being inactive. To initiate and/or switch between the first state 460 and the second state 470, the activation signal or deactivation signal can be passed onto a comparison step 452 that determines whether the control strategy is in its first or initial execution loop since start-up of the machine. If yes, the comparison step 452 recognizes that the line heater will likely be in the first state 460 corresponding to deactivation of the line heater. In fact, if the comparison step 452 determines that the control strategy is in its first execution loop, the comparison step 452 can trigger step 462 that affirmatively deactivates the line heater.

If the control strategy and the line heater are in the de-active first state 460, a comparison step 464 can be performed to determine if an activation signal has been generated by the prior operations of the control strategy. If not, the comparison step 464 determines that the control strategy should remain in the first state 460 and returns to step 462 thereby maintaining the line heater in the de-active state. If, however, the comparison step 464 determines that an activation signal has been generated, it causes the activation/deactivation subroutine 450 to switch to the active second state 470. In doing so, the activation/deactivation subroutine 450 may proceed to step 472 that affirmatively activates the line heater.

Once the control strategy and the line heater are in the active second state, another comparison step 474 can be executed that determines if a deactivation signal has been generated by the prior operations. If a deactivation signal has not been generated, thereby indicating that the line heater should remain on, the activation/deactivation subroutine remains in the second state 470 and continues to trigger step 472 maintaining activation of the line heater. If, however, the comparison step 474 registers a deactivation signal, the activation/deactivation subroutine 450 proceeds to determine whether to switch to the de-active first state.

For example, if the comparison step 474 registers a deactivation signal, a subsequent comparison step 476 can be performed to determine if the SCR system is currently dosing reductant agent. If comparison step 476 does determine the system is dosing, the activation/deactivation subroutine 450 can return to the first state 460 and in doing so can execute step 462 that de-activates the line heater. If, however, the comparison step 476 determines that the SCR system is not dosing, the activation/deactivation subroutine 450 can remain in the second state 470 and return to step 472 maintaining activation of the line heater. When the SCR system is not dosing, it may be desirable to remain in the active second state 470 to ensure that reductant agent remaining in the fluid line 128, possibly stagnate, does not freeze. Of course, in other embodiments, if the system is not dosing, the control strategy might terminate altogether.

While the activation/deactivation subroutine 450 has been described based on a determination in comparison step 452 that the control strategy is in its initial first execution loop, comparison step 452 might conclude that the control strategy is not in its first execution loop. If comparison step 452 makes such a determination, the activation/deactivation subroutine can proceed to step 454 that returns the subroutine to either the first state 460 or second state 470, depending on which state the control strategy was previously in. The activation/deactivation subroutine 450 can then proceed as described above.

INDUSTRIAL APPLICABILITY

As explained above, the disclosure is applicable to addressing issues arising from the use of SCR systems and the like in extremely cold temperatures. The disclosure can be employed with any type of machine having a power system with an SCR system or similar exhaust treatment measures to reduce the effect and quantity of harmful pollutants. Referring to FIGS. 1 and 2, the operator of the machine 102 can fill the storage tank 124 with a reductant agent such as urea. Upon startup, if the machine 102 is operating in a sufficiently cold environment, the controller 140 embodying the control strategy can determine whether the reductant agent in the fluid line 128 is in danger of freezing or possible frozen.

To do so, the controller 140 communicates with various sensors including the tank temperature sensor 144 and the ambient temperature sensor 146. Via this communication, the controller receives representative temperatures of the reductant agent in both the storage tank 124 and the fluid line 128. The representative temperatures are communicated to a control strategy for the SCR system 120. To check if the ambient temperature sensor and/or tank temperature sensor are malfunctioning, the temperature sensing routine 200 of the control strategy compares the representative temperatures with pre-set values that will indicate problems with the temperature sensors.

The representative temperature or error messages are sent to the LPRAT routine 230 which determines the LPRAT. The LPRAT will be set to the smaller of the representative ambient temperature or the tank temperature unless both are in error, in which case the LPRAT will be set to error. The hysteresis routine 300 processes the LPRAT and compares it with a desired reductant agent temperature to generate an activation signal or a deactivation signal. If the LPRAT is in error, however, the hysteresis routine 300 automatically generates a deactivation signal. The heater routine 400 receives the activation and/or deactivation signals from the hysteresis routine 300 and can perform other operations check the accuracy of those signals against other parameters. These can include further comparison with the ambient temperature surrounding the machine and checking whether the power system has been operating for a sufficient amount of time. The activation and/or deactivation signal are then communicated to the activation/deactivation subroutine 450 for actual activation or deactivation of a line heater 130 associated with the fluid line 128.

Processing of the temperatures data and other variables via the control strategy results in selective activation of the line heater 130 where certain conditions are met. For example, if both the tank temperature sensor and the ambient temperature sensor are malfunctioning, an activation signal is generated to activate the line heater. If the LPRAT is less than a desired reductant agent temperature, as activation signal is generated. If the LPRAT is greater than a desired reductant agent temperature, a deactivation signal is generated. If, however, the engine running time is less than a minimum engine running time, a deactivation signal is generated. Likewise, if the representative ambient temperature is greater than a minimum ambient temperature, a deactivation signal is generated. Selective activation of the line heater according to some or all of the above conditions can extend the useful life of the line heater and may prevent thermal degradation of the reductant agent in the fluid line.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method of controlling a line heater proximate a fluid line for communicating a reductant agent in a selective catalytic reduction system, the method comprising:
   measuring a tank temperature representative of the reductant agent accommodated in a storage tank;
   measuring a representative ambient temperature representative of an ambient temperature proximate the selective catalytic reduction system;
   determining a lowest possible reductant agent temperature from the tank temperature and the representative ambient temperature;
   comparing the lowest possible reductant agent temperature with a predetermined desired reductant agent temperature; and
   activating the line heater in response to comparing the lowest possible reductant agent temperature with a predetermined desired reductant agent temperature.

2. The method of claim 1, further comprising:
   comparing the tank temperature with a predetermined tank temperature value to check for error; and
   comparing the representative ambient temperature with a predetermined ambient temperature value to check for error.

3. The method of claim 2, wherein the step of determining the lowest possible reductant agent temperature comprises:
   setting the lowest possible reductant agent temperature to error if the tank temperature and the representative ambient temperature are in error;
   setting the lowest possible reductant agent temperature to the representative ambient temperature if the tank temperature is in error but not the representative ambient temperature;
   setting the lowest possible reductant agent temperature to the tank temperature if the representative ambient temperature is in error but not the tank temperature; and
   setting the lowest possible reductant agent temperature to the lesser of the tank temperature and the representative ambient temperature if neither are in error.

4. The method of claim 3, further comprising activating the line heater if the lowest possible reductant agent temperature is in error.

5. The method of claim 1, further comprising:
   measuring an actual running time of an internal combustion engine utilizing the selective catalytic reduction system from startup of the internal combustion engine;
   comparing the actual running time with a predetermined minimum running time; and
   deactivating or maintaining the line heater in a de-active state if the actual running time is lesser than or equal to the predetermined minimum running time.

6. The method of claim 1, further comprising:
   comparing the representative ambient temperature with a predetermined minimum ambient temperature; and
   deactivating or maintaining the line heater in a de-active state if the representative ambient temperature is greater than or equal to the predetermined minimum ambient temperature.

7. The method of claim 1, further comprising:
   generating an activation signal in response to comparing the lowest possible reductant agent temperature with the predetermined desired reductant agent temperature; and
   activating the line heater in response to the activation signal.

8. The method of claim 7, further comprising determining if the selective catalytic reduction system is dosing the reductant agent.

9. The method of claim 8, further comprising deactivating the line heater only in response to determining that the selective catalytic reduction system is dosing the reductant agent and absence of the activation signal.

10. A selective catalytic reduction system for use with an internal combustion engine, the selective catalytic reduction system comprising:
    a storage tank for accommodating a reductant agent, the storage tank including a tank temperature sensor for measuring a tank temperature representative of the reductant agent in the storage tank;
    an ambient temperature sensor for measuring a representative ambient temperature;
    a fluid line communicating the reductant agent from the storage tank to an introduction point in an exhaust system associated with the internal combustion engine, the fluid line including a line heater; and
    a controller communicating with the tank temperature sensor, the ambient temperature sensor, and the line heater, the controller including logic for determining a lowest possible reductant agent temperature based in part on information from the tank temperature sensor and the ambient temperature sensor;
    wherein the controller activates or deactivates the line heater upon determining the lowest possible reductant agent temperature.

11. The selective catalytic reduction system of claim 10, wherein the controller further includes logic for checking if the tank temperature sensor and the ambient temperature sensor are in error.

12. The selective catalytic reduction system of claim 11, wherein the controller activates the line heater if both the tank temperature sensor and the ambient temperature sensor are in error.

13. The selective catalytic reduction system of claim 10, wherein the controller:
    sets the lowest possible reductant agent temperature to the representative ambient temperature if the tank temperature sensor is in error but not the ambient temperature sensor;

sets the lowest possible reductant agent temperature to the tank temperature if the ambient temperature sensor is in error but not the tank temperature sensor; and sets the lowest possible reductant agent temperature to the lesser of the tank temperature and the representative ambient temperature if neither the tank temperature sensor or the ambient temperature sensor are in error.

14. The selective catalytic reduction system of claim 10, wherein the ambient temperature sensor is a virtual sensor indirectly measuring the representative ambient temperature.

15. The selective catalytic reduction system of claim 10, wherein the exhaust system includes a catalyst for reducing nitrous oxides in exhaust from the internal combustion engine.

16. The selective catalytic reduction system of claim 10, wherein the line heater is an electric resistance heater.

17. The selective catalytic reduction system of claim 10, wherein the reductant agent is urea.

18. A method of reducing nitrous oxides in exhaust from an internal combustion engine, the method comprising:

providing a catalyst in an exhaust system associated with the internal combustion engine;

providing a storage tank for accommodating a reductant agent, the storage tank in fluid communication with the exhaust system via a fluid line;

measuring a tank temperature representative of the reductant agent in the storage tank;

measuring a representative ambient temperature representative of an ambient temperature proximate the internal combustion engine;

determining a lowest possible reductant agent temperature based in part on the tank temperature and the representative ambient temperature; and activating a line heater proximate the fluid line in response to determining the lowest possible reductant agent temperature.

19. The method of claim 18, further comprising:

comparing the tank temperature with a predetermined tank temperature value to check for error;

comparing the representative ambient temperature with a predetermined ambient value to check for error; and activating the line heater if both the tank temperature and the representative ambient temperature are in error.

20. The method of claim 19, wherein the step of determining the lowest possible reductant agent temperature includes the steps of:

setting the lowest possible reductant agent temperature to error if the tank temperature and the representative ambient temperature are in error;

setting the lowest possible reductant agent temperature to the representative ambient temperature if the tank temperature is in error but not the representative ambient temperature;

setting the lowest possible reductant agent temperature to the tank temperature if the representative ambient temperature is in error but not the tank temperature; and setting the lowest possible reductant agent temperature to the lesser of the tank temperature and the representative ambient temperature if neither are in error.

* * * * *